UNITED STATES PATENT OFFICE.

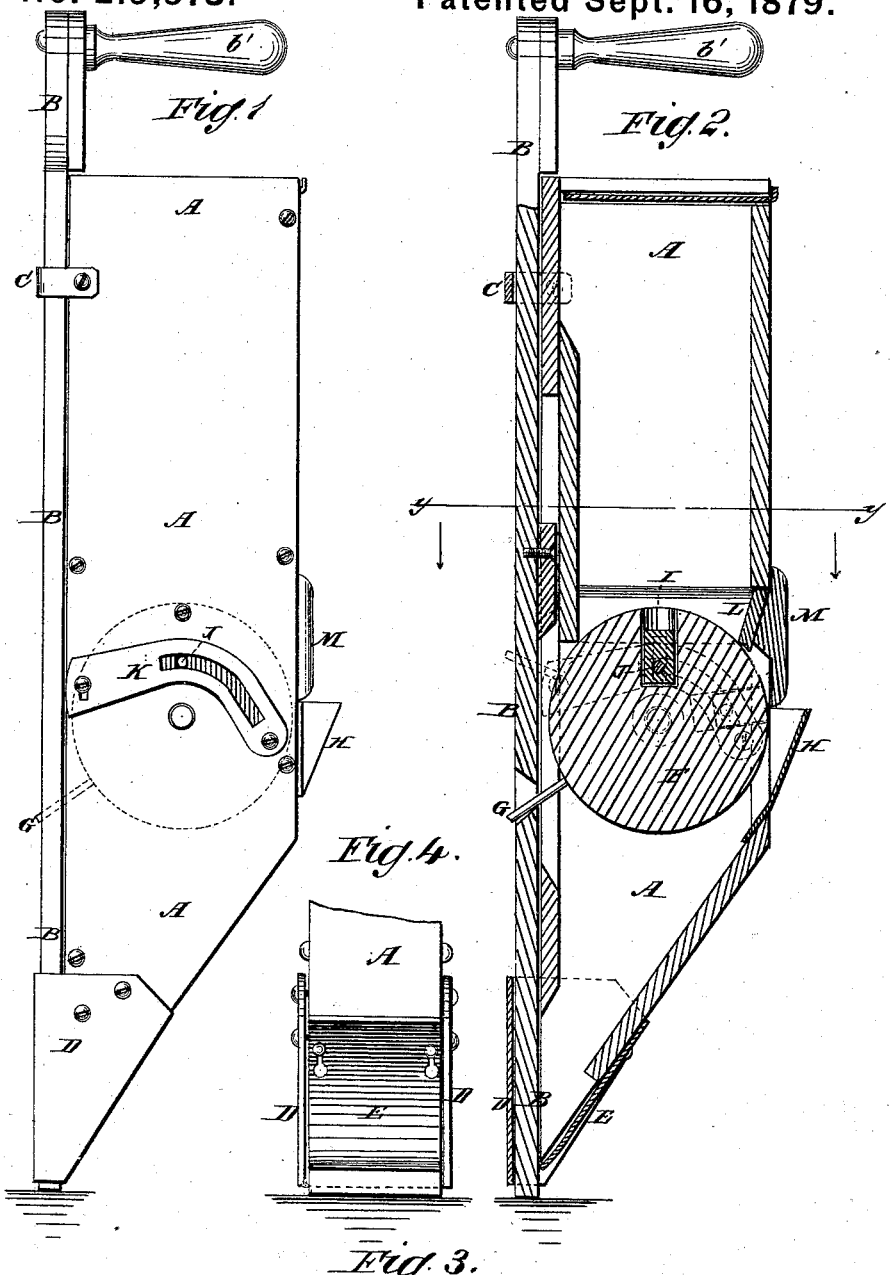

FRANCIS C. FROST, OF ANOKA, MINNESOTA.

IMPROVEMENT IN HAND CORN-PLANTERS.

Specification forming part of Letters Patent No. 219,573, dated September 16, 1879; application filed February 17, 1879.

*To all whom it may concern:*

Be it known that I, FRANCIS C. FROST, of Anoka, in the county of Anoka and State of Minnesota, have invented a new and useful Improvement in Hand Corn-Planters, of which the following is a specification.

Figure 1 is a side view of my improved hand corn-planter. Fig. 2 is a longitudinal section of the same, taken through the line $x\,x$, Fig. 3. Fig. 3 is a cross-section of the same, taken through the line $y\,y$, Fig. 2. Fig. 4 is a detail view of the lower part of the same.

Similar letters of reference indicate corresponding parts.

The object of this invention is to furnish an improved hand corn-planter which shall be so constructed that the seed may be forced out of the dropping-hole at the proper time, so that there can be no failure in dropping the seed, and which may be adjusted to drop less or more seed at a time, as may be required.

The invention consists in the combination of the plunger, the pin, and the cam-plates, with the dropping-wheel, provided with the lever, and with the box and the slide, as hereinafter fully described.

A is the box of the planter, the upper part of which serves as a seed-box, and its lower part as a conductor-spout. The lower end of the box A is beveled, to give it the proper shape to enter the ground.

B is the slide, which moves up and down along the forward side of the box A, and has a handle, $b'$, attached to its upper end.

The upper part of the slide B is kept in place against the front of the box A by a keeper, C, attached to the said box, and through which the said slide moves.

The lower end of the slide B is kept in place by the wide keeper D, which passes around it, and is attached to the box A.

The rear edges of the keeper D are beveled off, to correspond with the bevel of the box A.

The inclined lower part of the rear side of the box A does not extend quite to the lower end of the said box, and the open space thus formed is closed by the steel plate E.

The plate E is slotted to receive the screws by which it is secured to the inclined part of the box A, and the said slots have their lower ends enlarged sufficiently to pass over the heads of the said screws, so that the said plate may be detached, when required, by simply loosening the said screws.

F is the seed-dropping wheel, which is pivoted to the side boards of the box A, and to the forward side of which is attached a lever, G, which passes through a hole in the slide B, so that it may be turned to receive and drop the seed by the downward and upward movement of the said slide B.

In the upper side of the dropping-wheel F is formed a hole to receive the seed and drop it into the spout H, through which it slides into the lower part of the box A, whence it passes to the ground.

In the dropping-hole in the wheel F is placed a plunger, I, through which passes, and to which is secured, a pin, J.

The pin J passes through short radial slots in the wheel F, through curved slots in the sides of the box A, and through curved slots in the plates K, attached to the said sides of the box A.

The cam-plates K are secured at their ends to the sides of the box A by screws, and their forward ends have transverse slots formed in them to receive the said screws, so that they may be moved down to allow the dropping-hole to contain more seed, and up to cause it to contain less seed.

The grooves in the plates K are so curved as to force the plunger I outward and push the seed out of the dropping-hole as soon as the said hole has passed the cut-off brush L, attached to the rear side of the box A, above the spout H, and which is secured in place by a holding-block, M.

With this construction, as the slide B is drawn upward in raising the planter from the ground to move it from hill to hill, the dropping-wheel F will be turned to drop the seed for a hill into the lower part of the box A.

As the slide B is pushed downward in pressing the end of the planter into the ground, and in pushing the seed from the lower part of the box A into the ground, the dropping-wheel F will be turned back, so that its dropping-hole may be again filled with seed.

Having thus described my invention, I claim as new and desire to secure by Letters Patent—

The combination of the plunger I, the pin J, and the cam-plates K with the dropping-wheel F, provided with the lever G, and with the box A and the slide B, substantially as herein shown and described.

FRANCIS C. FROST.

Witnesses:
T. G. McLEAN,
E. E. DAVIS.